United States Patent Office 3,560,405
Patented Feb. 2, 1971

3,560,405
BUTADIENE POLYMERIZATION AND CATALYST SYSTEMS THEREFOR
Robert P. Zelinski, Bartlesville, Okla., and Rudolf H. Gaeth, Lake Jackson, Tex., assignors to Phillips Petroleum Company, a corporation of Delaware
No Drawing. Filed Feb. 26, 1968, Ser. No. 707,951
Int. Cl. C08f 1/44
U.S. Cl. 252—429                        3 Claims

ABSTRACT OF THE DISCLOSURE

A catalyst system comprising (1) a molybdenum trihalo dicarboxylate and a mixture of (2) an organometallic compound or a lithium aluminum hydride represented by the formulas $R_mAlCl_n$, $LiAlH_xR_{(4-x)}$, and $R_yM$ wherein R is a saturated aliphatic, saturated cycloaliphatic, or aromatic hydrocarbon radical or combinations thereof containing from 1 to 20 carbon atoms, $m$ and $n$ are integers of 1 or 2 such that $m+n=3$, $x$ is an integer of from 0 to 4, M is lithium, sodium, potassium, rubidium, cesium, beryllium, magnesium, zinc, cadmium, aluminum, gallium, or indium, and $y$ is an integer equal to the valence of the metal and (3) a nickel compound such as nickel oxide, a nickel salt of an organic or inorganic acid, a nickel salt of a beta-diketone, or a complex compound of nickel such as dicyclopentadienylnickel, nickel tetracarbonyl, or the nickel complex with the ethyl ester of acetoacetic acid or at least one transition metal compound of titanium, vanadium, chromium, molybdenum, manganese, cobalt or iron is employed for the polymerization of butadiene. Polymers ranging from high cis to high vinyl can be obtained using the catalysts of this invention. The products can be hydrogenated immediately following polymerization with the polymerization catalyst functioning as the catalyst for the hydrogenation step.

BACKGROUND OF THE INVENTION

The polymerization of butadiene in the presence of a catalyst comprising molybdenum pentachloride and a mixture of a nickel component and an organometallic compound or a lithium aluminum hydride is described in a copending application of R. H. Gaeth and F. E. Naylor, Ser. No. 533,453, filed Mar. 11, 1966, now U.S. Pat. 3,480,608, issued Nov. 25, 1969. By varying the amount of molybdenum pentachloride in the catalyst, it is possible to produce polymers ranging from high cis configuration to high vinyl configuration. While this catalyst system has numerous advantages, certain difficulties are involved in the handling and use of molybdenum pentachloride. It presents a storage problem on account of the ease with which it takes up moisture. It does not dissolve in the hydrocarbon diluents employed for polymerization and must, therefore, be charged as a dispersion. Hydrocarbon dispersions are not stable when stored so must be prepared just prior to being used.

It is an object of this invention to provide an improved process for the polymerization of butadiene. It is another object of this invention to provide a process for producing polybutadiene having a controlled structural configuration. It is a further object of this invention to provide a novel catalyst for polymerizing 1,3-butadiene.

Other aspects, advantages and objects of this invention will be apparent to those skilled in the art upon studying the accompanying disclosure and claims.

THE INVENTION

We have now discovered that the difficulties attendant in the use of molybdenum pentachloride in the aforementioned catalyst systems can be overcome if there is employed in its place a molybdenum trihalo dicarboxylate. These compounds are soluble in the hydrocarbon diluents employed for polymerization. They are easily prepared and can be charged as solutions in one or more hydrocarbons.

In addition, we have further discovered that if at least one transition metal compound of titanium, vanadium, chromium, molybdenum, manganese, cobalt, or iron is employed, instead of the nickel compound, along with a molybdenum trihalo carboxylate and an organometallic compound or a lithium aluminum hydride, polymers formed by the polymerization of butadiene have a high vinyl configuration, generally above 70 percent. The cis and trans structures are both low. These results are obtained even though the mole ratios and also the specific compounds employed in the catalyst systems are varied. It can thus be seen that the results obtained with this catalyst system differ from those in which the transition metal component is a nickel compound wherein the cis to vinyl configuration is varied.

While both catalyst systems are useful in the production of polymers of butadiene, the system utilizing the nickel compounds is preferred since it enables variation of microstructure.

The molybdenum trihalo dicarboxylates utilized in the catalyst systems of this invention can be represented by the formula $MoX_3(OCOR')_2$ wherein X is a halogen, i.e., fluorine, chlorine, bromine, or iodine, and R' is a saturated or unsaturated aliphatic or cycloaliphatic hydrocarbon radical or an aromatic hydrocarbon radical, or combinations thereof, containing from 3 to 29 or more carbon atoms. These compounds can be prepared by reacting an organic acid with molybdenum pentachloride in a halogenated hydrocarbon diluent, such as cholorform, carbon tetrachloride, tetrachloroethane, or the like, or a hydrocarbon diluent such as n-hexane, n-pentane, cyclohexane, benzene, toluene, xylene, or the like. Organic acids which can be employed include butyric acid, caprylic acid, capric acid, lauric acid, myristic acid, palmitic acid, stearic acid, nonadecanoic acid, arachidic acid, methacrylic acid, crotonic acid, 9-decenoic acid, 9-dodecenoic acid, oleic acid, linoleic acid, linolenic acid, cyclohexanecarboxylic acid, cyclohexaneacetic acid, 10-methylhendecanoic acid, benzoic acid, and other acids frequently designated as naphthenic acids, e.g., cyclopentanecarboxylic acid, cyclopentylacetic acid, 3-methylcyclopentylacetic acid, 4-methylcyclohexanecarboxylic acid, 2,2,6-trimethylcyclohexanecarboxylic acid, and the like.

Transition metal compounds that are employed include salts of organic (containing 2–20 carbon atoms) and inorganic acids; salts of beta-diketones; complex compounds such as dicyclopentadienyl compounds, and carbonyl compounds such as cobalt tetracarbonyl. Mixtures of any of these compounds can be used.

The following are examples of suitable transition metal compounds:

(a) Salts of organic acids of the formula $(R''-CO_2)_yM$ wherein R'' is an alkyl, cycloalkyl, aryl, alkaryl, or aralkyl hydrocarbon radical or combinations thereof containing from 1 to 19 carbon atoms; wherein M is a transition metal ion or oxy derivative thereof and wherein $y$ is the valence of N. Organic acids which can be employed include acetic acid, butyric acid, caprylic acid, capric acid, lauric acid, stearic acid, arachidic acid, cyclohexanecarboxylic acid, cyclohexaneacetic acid, phenylacetic acid, 2-naphthalenecarboxylic acid, 2-methyl-9-anthracenenecarboxylic acid, naphthenic acids, and the like.

(b) Salts of inorganic acids of the formula $M_q(Z)_p$ wherein Z is a radical such as halide, nitrate, sulfate, phosphate, and the like; wherein $q$ and $p$ are integers such that the salt is electrically neutral and wherein M has the same meaning as above. Inorganic acids which can be employed include hydrochloric acid, hydrobromic acid, hydroiodic acid, nitric acid, sulfuric acid, orthophosphoric acid, orthophosphorous acid, and the like.

(c) Salts of beta-diketones of the formula

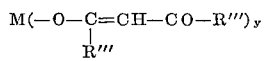

wherein R''' is a saturated aliphatic, saturated cycloaliphatic or aromatic radical or combination thereof, containing from 1 to 10 carbon atoms; and wherein M and y have the same meaning as above. Suitable beta-diketones include 2,4-pentanedione (acetylacetone), 3,5-heptanedione, 1,5-dicyclopentyl-2,4-pentanedione, 1,5-diphenyl-2,4-pentanedione, 1,5-di-p-butylphenyl-2,4-pentanedione, and the like.

(d) Complex compounds of the formula

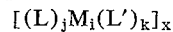

wherein L is selected from the group consisting of an aromatic compound containing from 6 to 12 carbon atoms, cyclopentadienyl, conjugated cycloheptatrienyl, conjugated cyclooctatrienyl groups, or hydrogen; wherein L' is selected from the group consisting of alkyl radicals (containing 1 to 6 carbon atoms), halide, nitrosyl and carbonyl or mixtures thereof; wherein M has the same meaning as before; wherein $k$ is an integer from 0 to 9; wherein $j$ in an integer from 0 to 2; wherein $i$ is an integer 1 or 2; and wherein $x$ is an integer 1 or larger and merely indicates a possible polymeric state. Suitable L groups include hydrogen, benzene, toluene, mesitylene, naphthalene, hexamethylbenzene, 1-phenyl-2,4,6-cycloheptatriene, 1-methyl-2,4,6-cycloheptatriene, 1,3,5-cyclooctatriene, cyclopentadienyl, and the like. Suitable L' groups include methyl, ethyl, n-hexyl, chloride, bromide, nitrosyl, carbonyl, cyano, and the like. More than one type of L' group can be present in these complexes.

The organometallic compounds that can be used in the process of our invention are compounds having the formula $R_mAlCl_n$, $LiAlH_xR_{(4-x)}$ or $R_yM$ wherein R is a saturated aliphatic, saturated cycloaliphatic or aromatic hydrocarbon radical or combinations thereof containing from 1 to 20 carbon atoms, $m$ and $n$ are integers of 1 or 2 such that $m + n = 3$, $x$ is an integer of from 0 to 4, M is lithium, sodium, potassium, rubidium, cesium, beryllium, magnesium, zinc, cadmium, aluminum, gallium, or indium, and $y$ is an integer equal to the valence of the metal. Mixtures of the foregoing organometallic compounds can be used.

Examples of suitable organometallic compounds include trimethylaluminum, triethylaluminum, triisobutylaluminum, tri-n-eicosylaluminum, triphenylaluminum, methylaluminum sesquichloride, ethylaluminum sesquichloride, lithium aluminum dimethyl dihydride, lithium aluminum butyl trihydride, lithium aluminum tri-n-decyl hydride, lithium aluminum n-eicosyl trihydride, lithium aluminum tetraethyl, lithium aluminum tetrabutyl, n-butyllithium, 4-tolylaluminum dichloride, diphenylaluminum chloride, 2-naphthyllithium, diethylmagnesium, diphenylmagnesium, trimethylgallium, diethylphenylgallium, tribenzylgallium, 4-methylcyclohexylpotassium, benzyllithium, n-eicosyllithium, phenylsodium, cyclohexylpotassium, isobutylrubidium, no-nonylcesium, diethylberyllium, diphenylberyllium, diethylzinc, dicyclopentylzinc, di-n-propylcadmium, dibenzylcadmium, trimethylindium, triphenylindium, and the like.

The nickel component used in our invention can be metallic nickel having a large surface area for its weight or a reducible nickel compound. When metallic nickel is used it should be in the form of a colloid, fine powder or porous solid such as reduced nickel adhered to carriers or Raney type nickel. The nickel compounds used in this invention are those nickel compounds that are capable of being reduced by the above-described organometallic compounds. In the desired reduction reaction the nickel is reduced to a lower valence state. The desired reduction is accomplished by contacting the nickel compound with the above-described organometallic compound or lithium aluminum hydride. Suitable reducible nickel compounds include nickel oxide, nickel salts of inorganic acids hydrocarbon carboxylic acids containing 2–20 carbon atoms, nickel salts of beta-diketones of the formula:

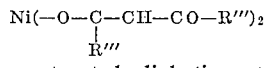

wherein R''' is a saturated aliphatic, saturated cycloaliphatic or aromatic hydrocarbon radical or combination thereof, containing from 1 to 10 carbon atoms, and complex compounds such as dicyclopentadienylnickel, and the nickel complex with the ethylester of acetoacetic acid. Examples of suitable nickel salts include the nickel salts of hydrochloric acid, hydrobromic acid, hydroiodic acid, sulfuric acid, nitric acid, phosphoric acid, caprylic acid, capric acid, lauric acid, myristic acid, palmitic acid, stearic acid, arachidic acid, cyclobutanecarboxylic acid, cyclohexanecarboxylic acid, benzoic acid, and 2-naphthoic acid. Examples of suitable nickel salts of the betadiketones include the nickel salts of 2,4-pentanedione (acetylacetone), 3,5-heptanedione, 1,5-dicyclopentyl-2,4-pentanedione, and the like. Mixtures of the foregoing nickel components can be used.

Nickel compounds that are reduced with the lithium aluminum hydride or the organometallic compounds are preferred in the process of our invention. Nickel compounds that are preferred are those which are substantially soluble in the hydrocarbon diluents used in the polymerization, such as the nickel salts of fatty acids and naphthenic acids. Through a proper choice of catalyst components, a completely soluble catalyst system is obtained.

It is within the scope of our invention to utilize nickel components that are supported on various carriers such as diatomaceous earth, silica-alumina, silica, alumina, titania, zirconia, kaolin, ion-exchange resins and the like. The metallic nickel or the reducible nickel compound, such as nickel oxides and the like, can be supported on the above-mentioned carriers.

The catalyst compositions used in this invention are formed by combining the lithium aluminum hydride or the organometallic compound and the nickel component or transition metal component prior to introduction of the molybdenum trihalo dicarboxylate. The lithium aluminum hydride or the organometallic compound and the metallic nickel or the nickel compound or transition metal compound can be combined in the presence of a hydrocarbon diluent. Suitable hydrocarbon diluents include those that are also suitable as a polymerization diluent. The diluent can be a paraffinic, cycloparaffinic, or aromatic hydrocarbon such as n-pentane, n-hexane, isooctane, cyclohexane, benzene, toluene, and the like. The mixture of the lithium aluminum hydride or the organometallic compound and the nickel component or transition metal compound is maintained at a temperature in the range of about 20 to 70° C. for a sufficient length of time to produce an active catalyst component. The aging time is dependent upon the particular compounds used and on the temperature of the reaction. Generally, the aging time will be in the range of about 5 minutes to 25 hours.

It has been found that when the concentrations of the lithium aluminum hydride or the organometallic compound and the nickel component or transition metal compound are quite low, the aging time may have to be increased slightly. After the desired aging has been achieved, the molybdenum trihalo dicarboxylate catalyst component is added to the polymerization zone containing the other catalyst components and the polymerization reaction is allowed to proceed. The 1,3-butadiene monomer can be added to the polymerization zone either prior to or after the introduction of the molybdenum trihalo dicarboxylate catalyst component.

The ratio of the nickel component to the lithium aluminum hydride or the organometallic compound is expressed in terms of gram atoms of nickel per gram mole of the lithium aluminum hydride or the organometallic compound. The ratio of the nickel component to the lithium aluminum hydride or the organometallic compound is in the range of 0.1 to 2 gram atoms of nickel per gram mole of lithium aluminum hydride or organometallic compound with from 0.2 to 1.5 being preferred. The mol ratio of the molybdenum trihalo dicarboxylate to the lithium aluminum hydride or the organometallic compound is in the range of 0.1:1 to 4:1. The preferred mol ratio of molybdenum trihalo dicarboxylate to organometallic compound or lithium aluminum hydride is from 0.2:1 to 2:1. The total catalyst level in the polymerization system is based on the nickel component and is generally in the range of about 0.05 to 5 gram atoms of nickel per 100 grams of the monomer. The preferred amount of the nickel component is generally in the range of about 0.1 to 2.5 gram atoms of nickel per 100 grams of the monomer.

The ratio of transition metal component to the lithium aluminum hydride or the organometallic compound is in the range of 0.1 to 2 gram atoms of the transition metal per gram mole of lithium aluminum hydride or organometallic compound. The mole ratio of molybdenum trihalo dicarboxylate to lithium aluminum hydride or the organometallic compound is in the range of 0.1:1 to 4:1. The total catalyst level is based on the transition metal component and is generally in the range of about 0.05 to 5 gram atoms of transition metal per 100 grams of monomer. The preferred amount is generally in the range of 0.1 to 2.5 gram atoms of transition metal per 100 grams of monomer.

It is particularly important that the molybdenum component in the catalyst system be soluble in hydrocarbon as high catalyst efficiency is dependent upon solubility.

Organometallic compounds are preferred over the lithium aluminum hydrides and of the organometallic compounds, the organoaluminum compounds, including organoaluminum chlorides, and various mixtures of these compounds, are preferred.

The polymerization is generally carried out in the presence of a hydrocarbon diluent. Suitable diluents include paraffinic, cycloparaffinic and aromatic hydrocarbons such as n-pentane, n-hexane, isooctane, cyclohexane, benzene, toluene, and the like and mixtures of the above. It is desirable to carry out the polymerization at a pressure such that at least a portion of the 1,3-butadiene monomer is in the liquid phase. The polymerization is usually carried out at a temperature in the range of 0 to 250° F. with a temperature in the range of 50 to 200° F. being preferred.

While not intending to be limited to any theory, we have found that at a given mole ratio of the nickel component to the lithium aluminum hydride or the organometallic compound, within the above-described limits, the ratio of cis to vinyl configuration in the polymer is governed by the total halogen content of the catalyst system. The molybdenum trihalo dicarboxylate supplies halogen and another source is from an organoaluminum chloride. An increase in halogen content increases the cis structure of the product. One convenient method for regulating the cis to vinyl configuration is to use a mixture of organometallic compounds, e.g., $R_3Al+RAlCl_2$, $R_3Al+R_2AlCl$, or $RAlCl_2+R_2AlCl$. Thus, the process of our invention utilizing the molybdenum component and nickel compounds provides a means for controlling the molecular weight and the microstructure of the polybutadiene product by varying the quantities and mole ratios of the initiator components.

Butadiene polymers prepared according to this invention can be hydrogenated by introducing hydrogen into the polymerization mixture after polymerization in the presence of the catalyst employed for the polymerization for a time and under conditions such that the desired number of double bonds are hydrogenated. Conditions for the hydrogenation reaction include temperatures in the range of about 50 to 500° F. and gage pressures up to about 1000 pounds per square inch. Preferred conditions are temperatures of 170 to 400° F. and pressures of 10 to 500 pounds per square inch gage. The reaction time can vary from one minute to 25 hours or more, preferably 15 minutes to 10 hours, depending upon the extent of hydrogenation desired.

The polymer products produced in accordance with our invention have many properties that make them valuable for a variety of commercial applications. The polymers produced in accordance with our invention which have a high vinyl content can be used in coating compositions, adhesive compositions, and in the manufacture of pressure-sensitive tapes and the like. Polymers having a high cis content can be useful in conventional tire tread and carcass applications either per se or in admixture with other types of synthetic rubbers as well as in blends with natural rubber. The use of cis-polybutadiene in such applications is well known. We have found that the polymer products produced by our invention which have approximately equal amounts of cis and vinyl structure can also be used in such applications as tires, tire carcasses and the like. Such polymers, having approximately equal vinyl and cis contents, have a good balance of modulus, tensile and elongation properties that compare favorably with those of conventional high cis-polybutadienes. However, such polymers have a lower heat build-up than found in conventional high cis-polybutadienes. This property makes them particularly suitable for use in the manufacture of tires and the like. It will be obvious to those skilled in the art that the polymers prepared in accordance with our invention can be compounded and vulcanized using known plasticizers, extenders, reinforcing agents, vulcanizing agents, vulcanization accelerators, and the like.

Depending on the degree of saturation, the hydrogenated polymeric products of this invention range from elastomers to thermoplastics. The rubbery products can be compounded and utilized as above while the plastic-type products are employed in the manufacture of molded and extruded articles such as pipe, bowls and the like. These hydrogenated products can be employed in applications wherein a high degree of oxidative stability is desirable.

It will be apparent to those skilled in the art that various modifications and changes may be made in the foregoing disclosure without departing from the spirit and scope of our invention.

The following examples are submitted to illustrate preferred embodiments of our invention. The examples should not be considered in such a way as to unduly limit the scope of our invention. Microstructure and inherent viscosity determinations in the examples were made according to the procedure shown in U.S. 3,215,682.

SPECIFIC EXAMPLES

Example I

The effect of varying the amounts of ethylaluminum dichloride and diethylaluminum chloride on the polymerization of butadiene in a catalyst system containing in addition to the organoaluminum chlorides, nickel naphthenate and molybdenum trichloride distearate, was determined. The polymerization recipe was as follows:

| | |
|---|---|
| 1,3-butadiene, parts by weight | 100 |
| Cyclohexane, parts by weight | 780 |
| Nickel naphthenate, mhm. | 1 |
| Diethylaluminum chloride (DEAC) and/or ethylaluminum chloride (EADC), mhm. | 5 |
| Molybdenum trichloride distearate ($MoCl_3St_2$), mhm. | 2 |
| Ni Compd: total organo Al compd. mole ratio | 0.2:1 |
| $MoCl_3St_2$: total organo Al compd. mole ratio | 0.4:1 |
| Temperature, ° F. | 122 |
| Time, hours | 3 |

Mhm.=gram millimoles per 100 grams monomer.

When conducting a polymerization, cyclohexane was charged first after which the reactor was purged with nitrogen. Butadiene was added followed by the nickel naphthenate, diethylaluminum chloride, ethylaluminum dichloride (when used), and finally the molybdenum trichloride distearate. The temperature was then adjusted to 122° F. and maintained at this level for the polymerization. The mixture was agitated throughout the polymerization period.

The molybdenum trichloride distearate employed was prepared by reacting stearic acid with molybdenum pentachloride in cyclohexane. The recipe was as follows:

Cyclohexane, ml. _____ 500.
Stearic acid, grams _____ 100 (0.35 mole).
Molybdenum pentachloride, grams __ 50 (0.18 mole).

The materials were charged to the reactor which was then purged with nitrogen for 10 minutes. The temperature was adjusted to 122° F. and maintained at this level for 15 hours. The reactor was then vented, purged with nitrogen for 15 minutes, and the contents were transferred to a vessel for storage. The molybdenum trichloride distearate was soluble in cyclohexane. The calculated molarity of the solution was 0.350.

At the conclusion of each polymerization the reaction was shortstopped with a 10 weight percent solution of 2,2′-methylene-bis(4-methyl-6-tert-butylphenol) in a mixture of equal parts by volume of isopropyl alcohol and toluene. The polymer was coagulated in isopropyl alcohol, separated, and dried. All products were gel free. Results were as follows:

| Run No. | EADC, mhm. | DEAC, mhm. | Conversion, percent | Microstructure, percent Cis | Trans | Vinyl | Inherent viscosity |
|---|---|---|---|---|---|---|---|
| 1 | 0 | 5 | 69.0 | 37.0 | 6.4 | 56.6 | 2.63 |
| 2 | 1 | 4 | 24.2 | 48.6 | 5.3 | 46.1 | 1.84 |
| 3 | 2 | 3 | 16.5 | 89.2 | 3.7 | 7.1 | 1.18 |

These data show that the cis:vinyl ratio in the products can be regulated by controlling the ratio of EADC:DEAC in the catalyst system. As the amount of ethylaluminum dichloride was increased (total millimoles organoaluminum chloride constant), thereby increasing the chlorine content in the catalyst system, the cis content of the product increased. The highest vinyl content was obtained in run 1 in which no ethylaluminum dichloride was employed.

Example II

Butadiene was polymerized in the presence of nickel naphthenate, molybdenum trichloride distearate, and either triethylaluminum or ethylaluminum sesquichloride as the catalyst. The molybdenum trichloride distearate was prepared as in Example I. The recipe was as follows:

1,3-butadiene, parts by weight _____ 100
Cyclohexane, parts by weight _____ 800
Nickel naphthenate, mhm. _____ 1
Triethylaluminum (TEA) or ethylaluminum
  sesquichloride (EASC), mhm. _____ 5
Molybdenum trichloride distearate, mhm. ____ 1
Ni compd:organo Al compd. mole ratio _____ 0.2:1
MoCl₃St₂:organo Al compd. mole ratio _____ 0.2:1
Temperature, ° F. _____ 122
Time, hours _____ 2

The polymerization procedure and method for recovering the polymer were the same as described in Example I. Results were as follows:

|  | TEA | EASC |
|---|---|---|
| Conversion, percent | 55 | 33 |
| Inherent viscosity | 4.23 | 1.22 |
| Gel, weight, percent | 0 | 0 |
| Microstructure, percent: |  |  |
| Cis | 18.9 | 91.9 |
| Trans | 8.2 | 4.9 |
| Vinyl | 72.9 | 3.2 |

These data show that the cis:vinyl ratio in the polymer is controlled by regulating the amount of total halogen in the system. The run in which triethylaluminum was used gave a high vinyl polymer whereas that in which ethylaluminum sesquichloride was used gave a high cis polymer.

Example III

Butadiene was polymerized in a series of runs in which the catalyst components were nickel octoate, ethylaluminum sesquichloride, and molybdenum trichloride distearate. The amounts of the first two catalyst components were held constant and the molybdenum trichloride distearate was varied. This latter component was prepared as described in Example I. The polymerization recipe was as follows:

1,3-butadiene, parts by weight _____ 100
Cyclohexane, parts by weight _____ 800
Nickel octoate, mhm. _____ 0.5
Ethylaluminum sesquichloride (EASC), mhm. _ 1
Molybdenum trichloride distearate
  (MoCl₃ST₂), mhm. _____ Variable
Temperature, ° F. _____ 158
Time, hours _____ 48

The polymerization procedure and method for recovering the polymer were the same as described in Example I. Results were as follows:

| Run No. | MoCl₃St₂, mhm. | MoCl₃St₂:EASC, mole ratio | Conversion, percent | Inherent viscosity |
|---|---|---|---|---|
| 1 | 0.2 | 0.2:1 | 29 | 1.03 |
| 2 | 0.4 | 0.4:1 | 23 | 1.52 |
| 3 | 0.8 | 0.8:1 | 49 | 1.54 |

Infrared scanning of films prepared from each of the polymers showed them to be essentially cis and vinyl with the cis content increasing as the molybdenum trichloride distearate increased (total halogen content in the system increased).

Example IV

Butadiene was polymerized in a series of runs using the following recipe and varying the amount of nickel octoate.

1,3-butadiene, parts by weight _____ 100
Cyclohexane, parts by weight _____ 800
Nickel octoate, mhm. _____ Variable
Ethylaluminum sesquichloride (EASC), mhm. ___ 1
Molybdenum trichloride distearate, mhm. _____ 2
Temperature, ° F. _____ 158
Time, hours _____ 48

The polymerization procedure and method for recovering the polymer were the same as described in Example I. Results were as follows:

| Run No. | Ni octoate, mhm | Conversion, percent |
|---|---|---|
| 1 | 0 | trace |
| 2 | 0.2 | 41 |
| 3 | 0.4 | 65 |

These data show that the nickel compound is an essential component in the catalyst system. Infrared scanning of films prepared from polymers from runs 2 and 3 showed them to be high cis polymers.

Example V

Transition metal naphthenates of cobalt, iron, manganese, chromium, and vanadium (vanadyl) were employed along with triethylaluminum and molybdenum trichloride distearate as catalysts for the polymerization of butadiene. The recipe was as follows:

| | |
|---|---|
| 1,3-butadiene, parts by weight | 100 |
| Cyclohexane, parts by weight | 800 |
| Metal naphthenate, mhm. | 1 |
| Triethylaluminum (TEA), mhm. | 2 |
| Molybdenum trichloride distearate (MoCl$_3$ST$_2$), mhm. | 2 |
| Metal naphthenate: TEA mole ratio | 0.5:1 |
| MoCl$_3$ST$_2$:TEA mole ratio | 2:1 |
| Temperature, °F. | 158 |
| Time, hours | 1.75 |

NOTE: Mhm.=gram millimoles per 100 grams monomer.

When conducting a polymerization, cyclohexane was charged first after which the reactor was purged with nitrogen. Butadiene was added followed by the metal naphthenate, triethylaluminum, and finally the molybdenum trichloride distearate. The temperature was then adjusted to 158° F. and maintained at this level throughout the polymerization period. The mixture was agitated during the polymerization.

The molybdenum trichloride distearate employed was prepared as described in Example I.

At the conclusion of each polymerization the reaction was shortstopped with a 10 weight percent solution of 2,2'-methylene-bis(4-methyl-6-tertbutylphenol) in a mixture of equal parts by volume of isopropyl alcohol and toluene. The polymer was coagulated in isopropyl alcohol, separated, and dried. All products were rubbers. Results were as follows:

| Run No. | Metal naphthenate | Conversion, percent | Inherent viscosity | Microstructure, percent | | |
|---|---|---|---|---|---|---|
| | | | | Cis | Trans | Vinyl |
| 1 | Cobalt | 60 | 2.75 | 21.9 | 5.6 | 72.5 |
| 2 | Iron | 55 | 2.94 | 2.7 | 7.2 | 90.1 |
| 3 | Manganese | 57 | 2.04 | 7.3 | 6.8 | 85.9 |
| 4 | Chromium | 45 | 3.05 | 5.6 | 7.3 | 87.1 |
| 5 | Vanadyl | 19 | 2.45 | 0. | 6.6 | 93.6 |

The data show that all polymers contained predominantly vinyl configuration.

Nickel naphthenate was used in the above recipe for the polymerization of butadiene. The product contained 92.4 percent cis configuration and had an inherent viscosity of 1.38. The results from this run show that nickel naphthenate gives a cis polymer whereas the naphthenates of the invention give high vinyl polymers.

Example VI

A mixture of rare earth metal octoates, naphthenates of iron, chromium, vanadium (vanadyl), titanium, molybdenum, and manganese were employed, along with triethylaluminum and molybdenum trichloride distearate as catalysts for the polymerization of butadiene. The molybdenum trichloride distearate was prepared as in Example I. The recipe was as follows:

| | |
|---|---|
| 1,3-butadiene, parts by weight | 100 |
| Cyclohexane, parts by weight | 780 |
| Metal octoate or naphthenate, mhm. | 1 |
| Triethylaluminum, mhm. | 5 |
| Molybdenum trichloride distearate, mhm. | 2 |
| Metal octoate or naphthenate:TEA mole ratio | 0.2:1 |
| MoCl$_3$St$_2$:TEA mole ratio | 0.4:1 |
| Temperature, °F. | 122 |
| Time, hours | Variable |

The polymerization procedure and method for recovering the polymers were the same as described in Example I. All products were rubbers. Results were as follows:

| Run No. | Metal octoate or naphthenate | Time, hours | Conversion, percent | Inherent viscosity | Microstructure, percent | | |
|---|---|---|---|---|---|---|---|
| | | | | | Cis | Vinyl | Trans |
| 1 | Rare earth octoate mixture [1] | 3.5 | 48 | 3.73 | | | [2] |
| 2 | Vanadyl naphthenate | 3.5 | 30.2 | 2.89 | | | [2] |
| 3 | Titanium naphthenate | 20 | 5.0 | 3.18 | 12.0 | 77.9 | 10.1 |
| 4 | Molybdenum naphthenate | 3.5 | 47 | 3.05 | 7.7 | 85 | 7.3 |

[1] A 6 weight percent rare earth octoate mixture in mineral spirits (painter's naphtha) obtained from Carlisle Chemical Works, Inc., Reading, Ohio; amount used calculated as cerium octoate.
[2] Infrared scanning of film showed predominantly vinyl polymer.

These data demonstrate that polymers prepared with the catalyst systems of this invention give products that have predominantly vinyl configuration.

Example VII

The recipe of Example VI was employed for the polymerization of butadiene except that 5 mhm. of diethylaluminum chloride was substituted for the triethylaluminum. The polymerization temperature was 122° F. and the time was 4 hours. Rubbery products were obtained in all runs. Results were as follows:

| Run No. | Metal octoate or naphthenate | Conversion, percent | Inherent Viscosity | Microstructure, percent | | |
|---|---|---|---|---|---|---|
| | | | | Cis | Trans | Vinyl |
| 1 | Rare earth octoate mixture [1] | 16 | 1.9 | 11.2 | 7.9 | 80.9 |
| 2 | Iron naphthenate | 9 | 1.27 | 7.1 | 7.7 | 85.2 |
| 3 | Chromium naphthenate | 9 | 1.28 | 9.0 | 8.3 | 82.7 |
| 4 | Cobalt naphthenate | 8 | 0.99 | 19.2 | 8.3 | 72.5 |
| 5 | Titanium naphthenate | 3 | 2.17 | 9.5 | 7.8 | 82.7 |

[1] A 6 weight percent rare earth octoate mixture in mineral spirits (painter's naphtha) obtained from Carlisle Chemical Works, Inc., Reading, Ohio; amount used calculated as cerium octoate.

These data show that high vinyl polymers are obtained when an organoaluminum halide is used as the reducing component in the catalyst system.

Reasonable variations and modifications of this invention can be made or followed, in view of the foregoing, without departing from the spirit or scope thereof.

We claim:
1. A catalyst system which forms on mixing (1) a molybdenum trihalo dicarboxylate of the formula MoX$_3$(OCOR')$_2$ wherein X is a halogen and R' is a hydrocarbon radical containing from 3 to 29 carbon atoms, (2) at least one metallic compound having the formula R$_m$AlCl$_n$, LiAlH$_x$R$_{(4-x)}$ or R$_y$M wherein R is a hydrocarbon radical containing from 1 to 20 carbon atoms, $m$ and $n$ are integers of 1 or 2 such that $m+n$ is 3, $x$ is an integer of 1 to 4, M is lithium, sodium, potassium, rubidium, cesium, beryllium, magnesium, zinc, cadmium, aluminum, gallium or indium, and $y$ is an integer equal to the valence of the metal, and (3) a com- pound selected from the group consisting of metallic nickel having a large surface area for its weight, nickel oxide, nickel salts of inorganic acids, nickel salts of hydrocarbon carboxylic acids containing 2 to 20 carbon atoms, nickel salts of beta-diketones of the formula

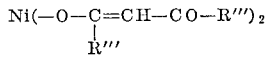

wherein $R'''$ is a hydrocarbon radical containing from 1 to 10 carbon atoms, dicyclopentadienylnickel, the nickel complex with the ethyl ester of acetoacetic acid and a transition metal compound of titanium, vanadium, chromium, molybdenum, manganese, cobalt and iron wherein said transition metal compound is (a) a salt of an organic acid having the formula $(R''-CO_2)_y M$ wherein $R''$ is a hydrocarbon radical containing from 1 to 19 carbon atoms, M is a transition metal ion or oxy derivative thereof and $y$ is the valence of M; (b) a salt of an inorganic acid having the formula $M_q(Z)_p$ wherein Z is a radical selected from the group consisting of halide, nitrate, sulfate and phosphate, $q$ and $p$ are integers such that the salt is electrically neutral, and M is a transition metal ion or oxy derivative thereof; (c) a salt of a beta-diketone having the formula

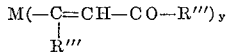

wherein $R'''$ is a hydrocarbon radical containing from 1 to 10 carbon atoms, M is a transition metal ion or oxy derivative thereof, and $y$ is the valence of M, or (d) a complex metal compound of the formula

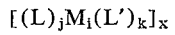

wherein L is selected from the group consisting of aromatic groups having from 6 to 12 carbon atoms, cyclopentadienyl, conjugated cycloheptatrienyl, conjugated cyclooctatrienyl and hydrogen, $L'$ is selected from the group consisting of 1–6 carbon alkyl radicals, a halide, nitrosyl, carbonyl and mixtures thereof, M is a transition metal ion or oxy derivative thereof, $k$ is an integer from 0 to 9, $j$ is an integer from 0 to 2, $i$ is an integer of 1 or 2, and $x$ is an integer of at least 1, and wherein the ratio of said component (3) to said metallic compound (2) is in the range of 0.1 to 2 gram atoms of (3) per gram mol of (2), and the mol ratio of said molybdenum trihalo dicarboxylate (1) to said metallic compound (2) is in the range of 0.1:1 to 4:1.

2. The composition of claim 1 wherein said nickel component is a nickel salt of a fatty acid containing up to 40 carbon atoms and said metallic compound is a trialkylaluminum compound.

3. The composition of claim 2 wherein said nickel salt of a fatty acid is nickel stearate and said trialkylaluminum compound is triethylaluminum.

References Cited
UNITED STATES PATENTS

| | | | |
|---|---|---|---|
| 3,060,179 | 10/1962 | Toland | 252—431(carb)X |
| 3,310,586 | 3/1967 | Hay | 252—431(carb)X |

PATRICK P. GARVIN, Primary Examiner

U.S. Cl. X.R.

252—428, 430, 431; 260—94.3

UNITED STATES PATENT OFFICE

CERTIFICATE OF CORRECTION

Patent No. 3,560,405                            Dated: February 2, 1971

It is certified that error appears in the above-identified patent and that said Letters Patent are hereby corrected as shown below:

Claim 1, column 11, line 26, the formula $M(-C=CH-CO-R''')_y$ with $R'''$ below the first C, should read — $M(-O-C=CH-CO-R''')_y$ — with $R'''$ below the C.

Signed and sealed this 1st day of June 1971.

(SEAL)
Attest:

EDWARD M. FLETCHER, JR.               WILLIAM E. SCHUYLER, JR.
Attesting Officer                       Commissioner of Patents